United States Patent
Morise et al.

(10) Patent No.: US 7,594,452 B2
(45) Date of Patent: Sep. 29, 2009

(54) CONTROL UNIT MOUNTING STRUCTURE FOR POWER TRANSMISSION DEVICE

(75) Inventors: Masaru Morise, Nukata-gun (JP); Norimi Asahara, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 166 days.

(21) Appl. No.: 11/349,137

(22) Filed: Feb. 8, 2006

(65) Prior Publication Data
US 2006/0219050 A1 Oct. 5, 2006

(30) Foreign Application Priority Data
Mar. 14, 2005 (JP) .............................. 2005-071166

(51) Int. Cl.
*F16H 57/04* (2006.01)
(52) U.S. Cl. .................................................. 74/606 R
(58) Field of Classification Search ............... 74/606 R; 439/34, 43, 620.01, 620.15, 620.21, 620.22
See application file for complete search history.

(56) References Cited

U.S. PATENT DOCUMENTS

| | | | | |
|---|---|---|---|---|
| 4,271,728 A | * | 6/1981 | Wakamatsu .................. | 477/34 |
| 5,662,007 A | * | 9/1997 | Starker et al. ............. | 74/606 A |
| 6,162,142 A | * | 12/2000 | Hori et al. .................. | 475/149 |
| 6,189,396 B1 | | 2/2001 | Barnreiter et al. | |
| 6,537,105 B2 | * | 3/2003 | Higashida et al. .......... | 439/528 |
| 6,619,995 B1 | * | 9/2003 | Hayashi et al. ............. | 439/701 |
| 6,679,137 B1 | * | 1/2004 | Bek .......................... | 74/606 R |
| 6,938,511 B2 | * | 9/2005 | Meier et al. ................. | 74/425 |
| 7,055,405 B1 | | 6/2006 | Nitsche | |
| 2002/0149283 A1 | * | 10/2002 | Hager et al. ................ | 310/239 |
| 2002/0166409 A1 | * | 11/2002 | True et al. .................. | 74/606 R |
| 2002/0166410 A1 | * | 11/2002 | Yamane et al. ............ | 74/606 R |
| 2004/0166735 A1 | * | 8/2004 | Gibboney .................. | 439/620 |
| 2007/0078036 A1 | * | 4/2007 | Morise ....................... | 475/159 |

FOREIGN PATENT DOCUMENTS

| | | |
|---|---|---|
| DE | 33 10 477 A1 | 1/1984 |
| DE | 19604948 | 8/1997 |
| DE | 19950967 | 5/2001 |
| FR | 2 798 179 | 3/2001 |
| JP | 8-295147 | 11/1996 |
| JP | 10-315797 | 12/1998 |
| JP | 11-257483 | 9/1999 |
| JP | 2001-99281 | 4/2001 |
| JP | 2002-57473 | 2/2002 |
| JP | 2002-174331 | 6/2002 |
| KR | 1998-087041 | 12/1998 |

* cited by examiner

*Primary Examiner*—Vicky A Johnson
(74) *Attorney, Agent, or Firm*—Oblon, Spivak, McClelland, Maier & Neustadt, L.L.P.

(57) ABSTRACT

A control unit mounting structure capable of being detached without disassembling a casing is provided. The control unit mounting structure includes a casing having a through hole, a connector fitting into the through hole, and an ECU accommodated in the connector and located within the casing. The connector has a flange section in contact with an outer surface of the casing, and the flange section is fixed to the casing.

5 Claims, 3 Drawing Sheets

CONTROL UNIT MOUNTING STRUCTURE FOR POWER TRANSMISSION DEVICE

This nonprovisional application is based on Japanese Patent Application No. 2005-071166 filed with the Japan Patent Office on Mar. 14, 2005, the entire contents of which are hereby incorporated by reference.

BACKGROUND OF THE INVENTION

1. Field of the Invention

The present invention relates to a control unit mounting structure for a power transmission device, and more particularly, to a control unit mounting structure for a power transmission device equipped in a vehicle.

2. Description of the Background Art

A control unit mounting structure has conventionally been disclosed for example in Japanese Patent Laying-Open No. 11-257483.

Japanese Patent Laying-Open No. 11-257483 discloses a technique to provide a control unit electrically connected to a hydraulic control device within a casing of an automatic transmission, within the casing. Specifically, the control unit is disposed within an oil pan. When the control unit is disposed within the casing in such a manner, it is provided at a position close to the hydraulic control device, and thus a signal line therebetween can be shortened, improving a communication environment. However, the casing should be detached when the control unit is to be replaced, causing a problem of making maintenance work complicated.

SUMMARY OF THE INVENTION

The present invention has been made to solve the aforementioned problem, and one object of the present invention is to provide a readily replaceable control unit mounting structure for a power transmission device.

A control unit mounting structure for a power transmission device in accordance with a first invention includes a casing having a through hole, a connector fitting into the through hole, and a control unit accommodated in the connector and located within the casing.

According to the first invention, the control unit is accommodated in the connector, and the connector fits into the through hole in the casing. Accordingly, when the control unit is to be detached, the connector can be pulled out of the through hole and then disassembled, without requiring conventional detachment of the whole casing. As a result, a readily replaceable control unit mounting structure can be provided.

In addition to the arrangement in the first invention, in a control unit mounting structure for a power transmission device in accordance with a second invention, the connector has a flange section in contact with an outer surface of the casing, and the flange section is fixed to the casing.

According to the second invention, since the flange section is fixed to the casing, the connector can be attached to the casing firmly, and prevented from being inserted too deep into the casing even when the connector is pulled from the inside of the casing.

In addition to the arrangements in the first and second inventions, in a control unit mounting structure for a power transmission device in accordance with a third invention, the control unit is electrically connected with a hydraulic control device, the hydraulic control device has valve bodies and a connecting section connected to the connector, and the connecting section is held by the valve bodies and restricted from moving when the connector is attached and detached.

According to the third invention, since the connecting section is held by the valve bodies when the control unit is attached and detached, the connecting section can be prevented from being deformed, and can surely be attached and detached.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
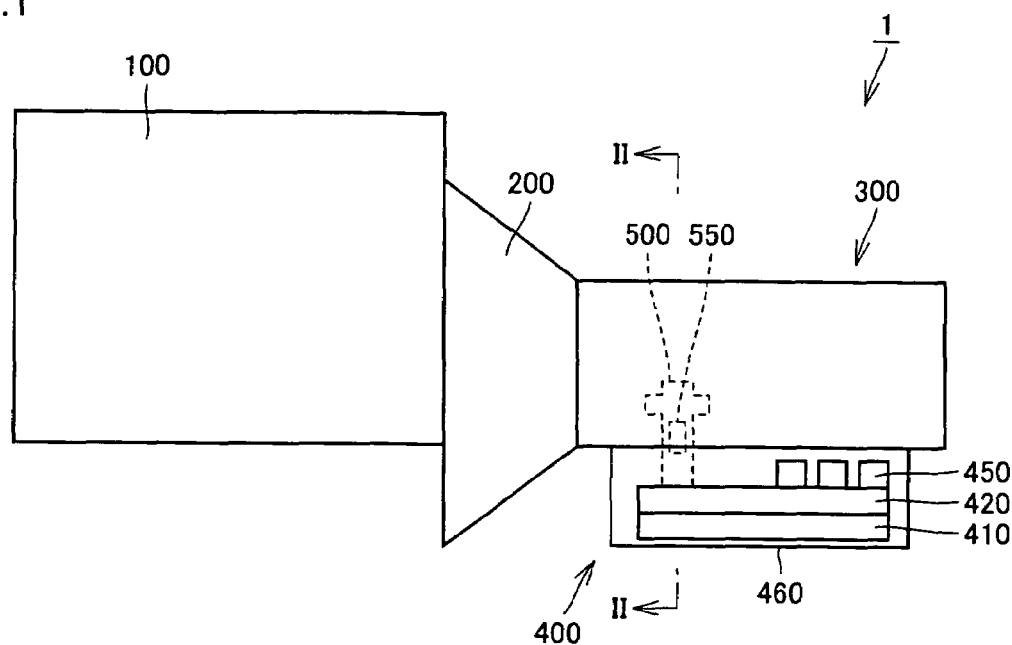
FIG. 1 is a schematic view of a vehicle according to an embodiment of the present invention.

Hereinafter, an embodiment of the present invention will be described with reference to the drawings. In the description below, identical reference numerals refer to identical parts having identical names and functions. Therefore, a detailed description thereof will not be repeated.

Referring to FIG. 1, a description will be given on a vehicle equipped with a control unit mounting structure for a power transmission device in accordance with the present embodiment. A vehicle 1 includes an engine 100 and a transaxle 300 connected to engine 100.

Engine 100 is an internal combustion engine combusting a mixture of air and a fuel injected from an injector in a combustion chamber within a cylinder. The combustion depresses a piston in the cylinder to rotate a crankshaft. It is to be noted that an external combustion engine may be used instead of an internal combustion engine. In addition, a rotating electric machine may be used instead of engine 100. Further, engine 100 may be a straight engine, a V-type engine, a W-type engine, a horizontally opposed engine, or the like. Furthermore, engine 100 may be any of a gasoline engine and a diesel engine.

Transaxle 300 is a device converting a torque and the number of revolutions of rotation transmitted from engine 100. A torque converter 200 is disposed in transaxle 300 at a portion close to engine 100. Torque converter 200 converts the torque and the number of revolutions of the crankshaft in engine 100 for transmission to a gear train in transaxle 300.

Transaxle 300 accommodates an automatic transmission, and a hydraulic control device 400 for controlling operation of the automatic transmission is disposed below transaxle 300. Hydraulic control device 400 as a hydraulic control section is disposed surrounded by an oil pan 460. Hydraulic control device 400 has a lower valve body 410, an upper valve body 420 on lower valve body 410, and a solenoid 450 controlling a flow of an ATF (automatic transmission fluid).

Solenoid 450 is formed of a spool valve, and opens/closes an oil path when energized/not energized to supply/shut off hydraulic pressure.

Although solenoid 450 is attached to upper valve body 420 in FIG. 1, the arrangement thereof is not limited to this, and solenoid 450 may be attached to lower valve body 410.

Transaxle 300 is provided with a connecter 500 accommodating an ECU (electronic control unit) 550 therein. Connector 500 is a member electrically connected with solenoid 450, and ECU 550 within connector 500 is electrically connected with solenoid 450.

Figure 2:
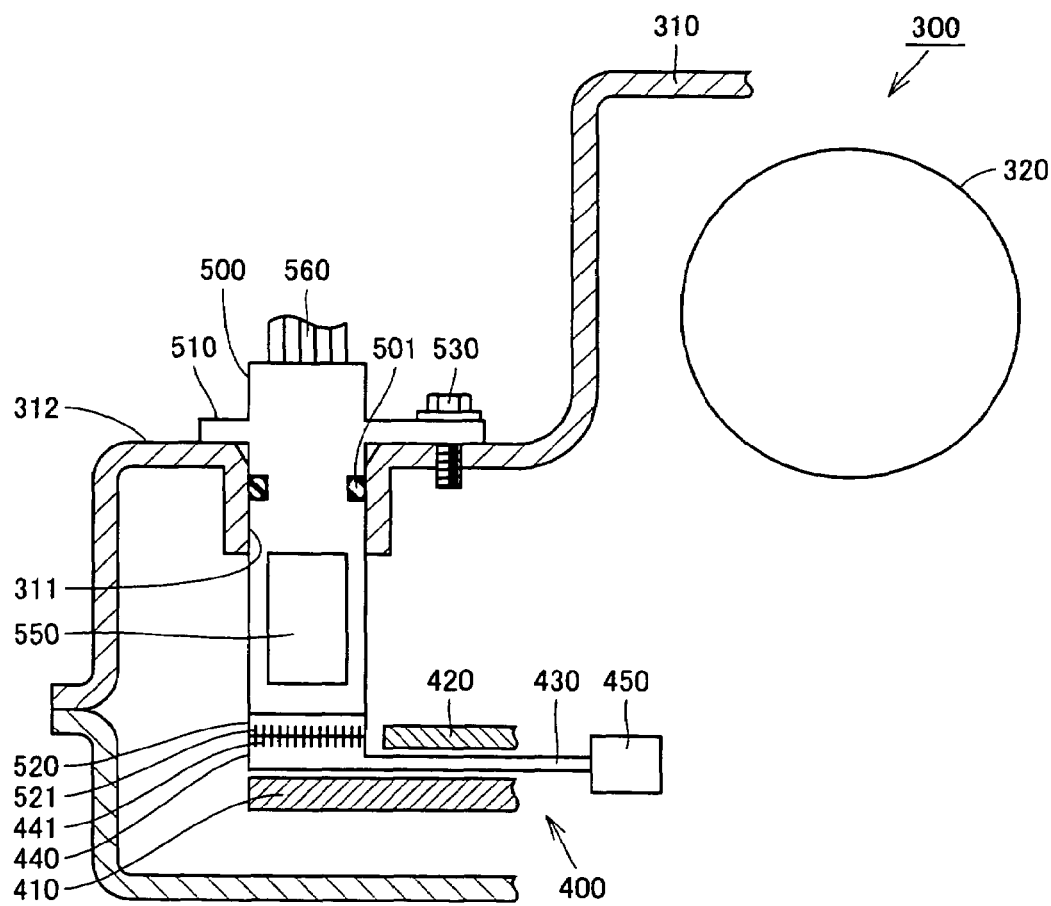
FIG. 2 is a cross-sectional view taken along a line II-II in FIG. 1.

Referring to FIG. 2, transaxle 300 has a casing 310, and a gear train 320 including a planetary gear and the like is accommodated within casing 310. Casing 310 has a through hole 311, and connector 500 fits into through hole 311. Oil pan 460 is in contact with a lower portion of casing 310. Casing 310 is for example a casing for a transaxle of an automatic transmission, coming into contact with a transaxle housing and a transaxle rear cover.

Connector 500 serves as a lid for closing through hole 311, and a seal ring 501 is provided to connector 500 to seal through hole 311. A flange section 510 having a large diameter is provided around the outer perimeter of connector 500, coming into contact with an outer surface 312 of casing 310. Flange section 510 is fixed to casing 310 with a bolt 530. ECU 550 is accommodated in connector 500. ECU 550 is an operational device controlling hydraulic control device 400 in response to signals sent from various sensors, a position switch of the automatic transmission, and the like, and based on a map and a program stored in a ROM (read only memory), to allow a vehicle to drive in a desired state. ECU 550 is connected with a wire 560 and connecting pins 521.

A connecting section 520 is provided at a leading end of connector 500, and a plurality of connecting pins 521 for establishing electrical contact with another element are disposed at a leading end of connecting section 520.

The shape of connector 500 is not limited to that shown in FIG. 2. For example, flange section 510 may not necessarily be shaped like a disc, and it may be cut off partially. Specifically, as long as a flange exists in a portion supported with bolt 530 in FIG. 2, there may be no flange in the other portion.

Further, connector 500 may be threaded into through hole 311, with through hole 311 internally threaded and an outer surface of connector 500 externally threaded. Furthermore, connector 500 may be positioned using a lock pin to lock connector 500 not to be pulled out once it is inserted into through hole 311.

Further, as for an outer shape of connector 500, not only a circular cylindrical shape but also other various shapes including a rectangular column shape, an elliptic cylindrical shape, and the like can be employed.

Although connector 500 has a constant outer diameter except for flange section 510, connector 500 is not limited to that having a constant outer diameter, and it may have a tapered shape. Specifically, connector 500 having a larger diameter on the side of wire 560 and a smaller diameter on the side of connecting section 520 may be used. When such a connector 500 is inserted into through hole 311, a portion thereof has the same diameter as that of through hole 311, and thus further insertion of connector 500 into through hole 311 beyond that portion is prevented.

A connecting section 440 of a wire transmission 430 is in contact with connecting section 520 of connector 500. Connecting section 440 has a plurality of connecting pins 441, which are electrically connected to connecting section 520. Wire transmission 430 is positioned between lower valve body 410 and upper valve body 420. Wire transmission 430 is a signal line electrically connecting ECU 550 with solenoid 450, and an electrical signal for driving solenoid 450 is transmitted from ECU 550 via wire transmission 430 to solenoid 450.

Figure 3:
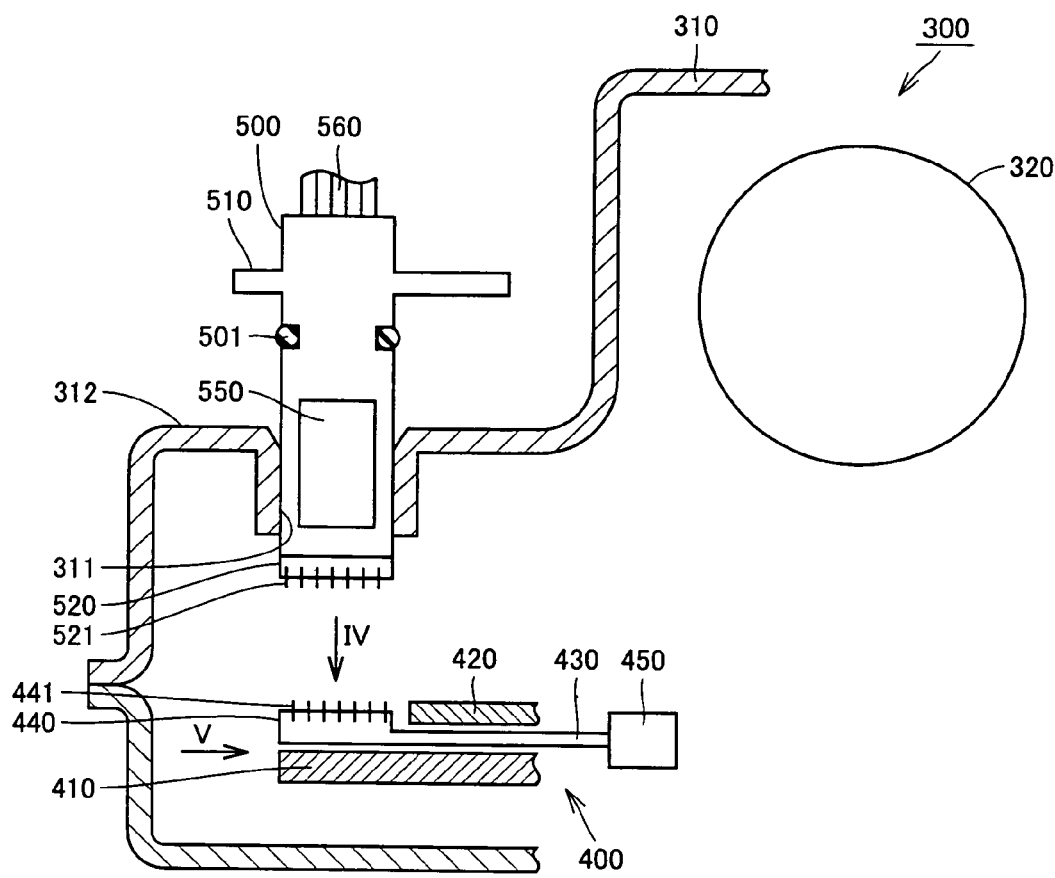
FIG. 3 is a cross-sectional view of a connector and a wire transmission separated from each other.

As shown in FIG. 3, connector 500 can be detached from wire transmission 430. Specifically, connector 500 is provided to be attachable and detachable with respect to wire transmission 430. A concave portion is formed in each of connecting sections 440 and 520, and connecting pins 441 and 521 are fit into the concave portions. FIG. 3 shows that connecting pins 521 and 441 protrude from the side of connector 500 and the side of wire transmission 430, respectively. The arrangement of the connecting pins is not limited to this, and only wire transmission 430 may be provided with connecting pins 441 and connector 500 may have no connecting pin but instead it may have only a concave portion for receiving connecting pins 441. On the contrary, only connector 500 may be provided with connecting pins 521 and wire transmission 430 may have no connecting pin but instead it may have only a concave portion for receiving connecting pins 521.

Figure 4:
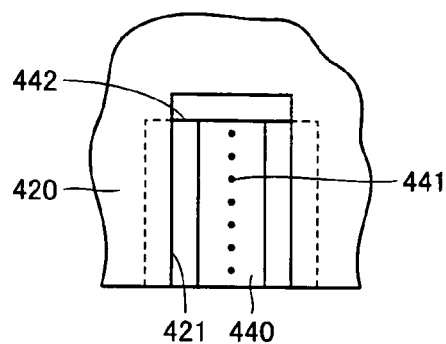
FIG. 4 is a plan view of a connecting section seen from a direction indicated by an arrow IV in FIG. 3.

Referring to FIG. 4, connecting section 440 is exposed from a concave-shaped portion (a cut-off portion 421) of upper valve body 420. Connecting section 440 has a substantially rectangular shape, and connecting pins 441 are disposed thereon in a line. Cut-off portion 421 of upper valve body 420 surrounds connecting section 440 in three directions. Connecting section 440 has a shoulder portion 442, which is shaped to get under upper valve body 420.

Figure 5:
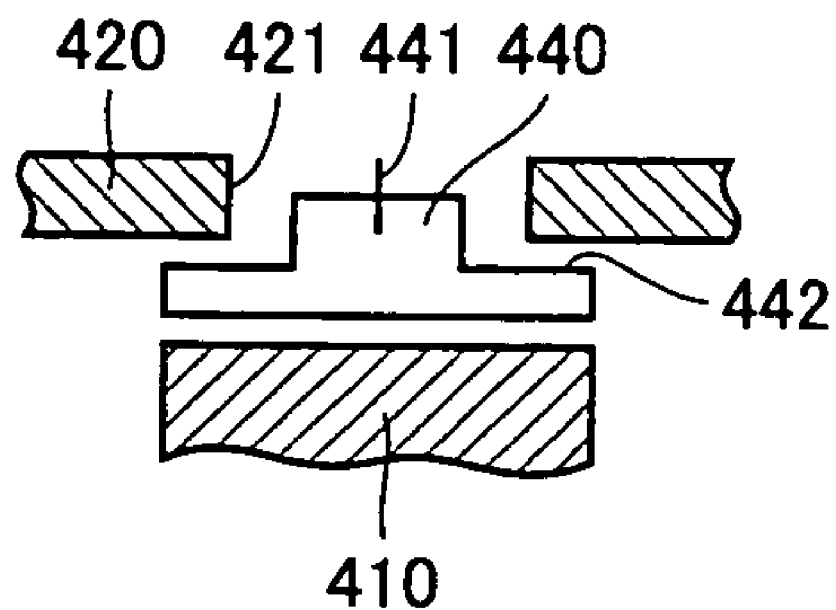
FIG. 5 is a side view of the connecting section seen from a direction indicated by an arrow V in FIG. 3.

Referring to FIG. 5, connecting section 440 is disposed on lower valve body 410. Connecting section 440 has a "convex" shape with shoulder portion 442 extending outward. Upper valve body 420 is disposed on connecting section 440, and a protruding portion of connecting section 440 and connecting pins 441 are located in cut-off portion 421 of upper valve body 420.

A description will now be given on attachment and detachment of connector 500. Firstly, when connector 500 is to be attached, the leading end of connector 500 is inserted into through hole 311 as shown in FIG. 3, and connector 500 is further depressed in a direction in which connecting section 520 of connector 500 approaches connecting section 440 of wire transmission 430. When connecting section 520 of connector 500 comes into contact with connecting section 440 of wire transmission 430, a downward depressing force is applied from connector 500 to connecting section 440, attempting to move connecting section 440 downward. However, since lower valve body 410 supports connecting section 440 from the underside as shown in FIGS. 2 and 5, downward movement of connecting section 440 can be prevented. As a result, connector 500 can surely be inserted into connecting section 440.

Next, when connector 500 is to be detached, connector 500 is pulled upward from the position shown in FIG. 2. Although an upward force is exerted on connecting section 440 in this case, attempting to move it upward, connecting section 440 cannot move upward because shoulder portion 442 of connecting section 440 comes into contact with upper valve body 420, specifically, upper valve body 420 prevents connecting section 440 from moving upward. As a result, only connecting section 520 of connector 500 is moved upward, and the distance between two connecting sections 440 and 520 is increased. Thereby, connector 500 is detached from wire transmission 430 to complete detachment.

As described above, in the present invention, through hole 311 is formed in casing 310 of an automatic transmission, and ECU 550 smaller than through hole 311 is held within connector 500. Connector 500 serving as a lid for through hole 311 is integrated with ECU 550, and connector 500 is formed to be detachable from wire transmission 430 (W/T). Connector 500 is provided with wire 560 for transmitting an electric signal to and from outside. Specifically, when connector 500 is to be attached and detached, connecting section 440 of wire transmission 430 is held by lower valve body 410 and upper valve body 420, and restricted from moving.

Since ECU 550 is accommodated in connector 500 in the control unit mounting structure according to the present invention formed as described above, ECU 550 can be disposed within a casing, and ECU 550 can be replaced without disassembling casing 310.

Further, since flange section 510 is provided, it can prevent connector 500 from being inserted too deep. Furthermore, since connecting section 440 of wire transmission 430 is held by lower valve body 410 and upper valve body 420 as shown in FIGS. 4 and 5, wire transmission 430 can be prevented from being deformed when connector 500 is attached and detached.

Although the embodiment of the present invention has been described, the embodiment herein described can be modified in various ways.

Firstly, although the embodiment illustrates an example in which ECU 550 is electrically connected to solenoid 450, ECU 550 may not necessarily be electrically connected to solenoid 450. There are various electronic components disposed within transaxle 300. Specifically, transaxle 300 may be provided with a sensor detecting the number of revolutions of an input shaft input to a transmission, or a counter gear rotation sensor detecting the number of revolutions of a counter drive gear. Further, a sensor controlling oil temperature may be disposed within casing 310 of transaxle 300. ECU 550 can be electrically connected to these sensors and process an electric signal obtained by the sensors for transmission to outside.

Furthermore, the present invention is applicable not only to the field of an automatic transmission, but also to the field of various power transmission devices. It is sufficient if an electronic component is disposed in a casing of a power transmission device, and the electronic component is electrically connected with ECU 550. Specifically, various sensors provided within a manual transmission may be electrically connected with ECU 550. Further, actuators in an MMT (multi-mode manual transmission) may be electrically connected with ECU 550.

Actuators or sensors within a transmission as well as a differential, a transfer, and an ADD (automatic differential disconnect) may be electrically connected with ECU 550.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control unit mounting structure for a power transmission device, comprising:
    a casing having a through hole;
    a connector fitting into said through hole;
    a control unit accommodated in said connector; and
    a hydraulic control device electrically connected with said control unit,
    wherein the hydraulic control device includes a lower valve body, an upper valve body on the lower valve body, and a connecting section located between the lower valve body and the upper valve body, the connecting section being exposed from a concave-shaped portion of the upper valve body and being connected to said connector,
    wherein the connecting section is held by said lower valve body and said upper valve body and is restricted from moving when said connector is attached and detached,
    wherein, when the connector is fitted into the through hole, the control unit is located within said casing.

2. The control unit mounting structure for a power transmission device according to claim 1, wherein
    said connector has a flange section in contact with an outer surface of said casing, and
    said flange section is fixed to said casing.

3. The control unit mounting structure for a power transmission device according to claim 1, wherein the control unit is an electronic control unit configured to control the hydraulic control device.

4. The control unit mounting structure for a power transmission device according to claim 1, wherein when attached, a portion of the connector is located outside of the casing, and a portion of the connector is located inside of the casing.

5. The control unit mounting structure for a power transmission device according to claim 4, wherein the control unit is located in the portion of the connector located inside of the casing.

* * * * *